(12) United States Patent
Gill

(10) Patent No.: US 6,317,298 B1
(45) Date of Patent: Nov. 13, 2001

(54) SPIN VALVE READ SENSOR WITH SPECULAR REFLECTOR STRUCTURE BETWEEN A FREE LAYER STRUCTURE AND A KEEPER LAYER

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/344,459

(22) Filed: Jun. 25, 1999

(51) Int. Cl.[7] ................................................. G11B 5/39
(52) U.S. Cl. ........................................................ 360/324.11
(58) Field of Search ............................ 360/324.1, 324.11, 360/324.12, 314, 317

(56) References Cited

U.S. PATENT DOCUMENTS 5,287,238 * 2/1994 Baumgart et al. ................... 360/314

* cited by examiner

Primary Examiner—Craig A. Renner
(74) Attorney, Agent, or Firm—Gray Cary Ware & Freidenrich; Ervin F. Johnston

(57) ABSTRACT

A specular reflector structure including one or more layers is located between a free layer structure and a keeper layer for reflecting conduction electrons toward the free layer so as to increase the magnetoresistive coefficient (dr/R) of the spin valve sensor. In the preferred embodiment the specular reflector structure includes a first specular reflector layer of silver (Ag) and a second specular reflector layer of copper (Cu) with the first specular reflector layer interfacing the keeper layer and the second specular reflector layer interfacing the free layer.

27 Claims, 14 Drawing Sheets

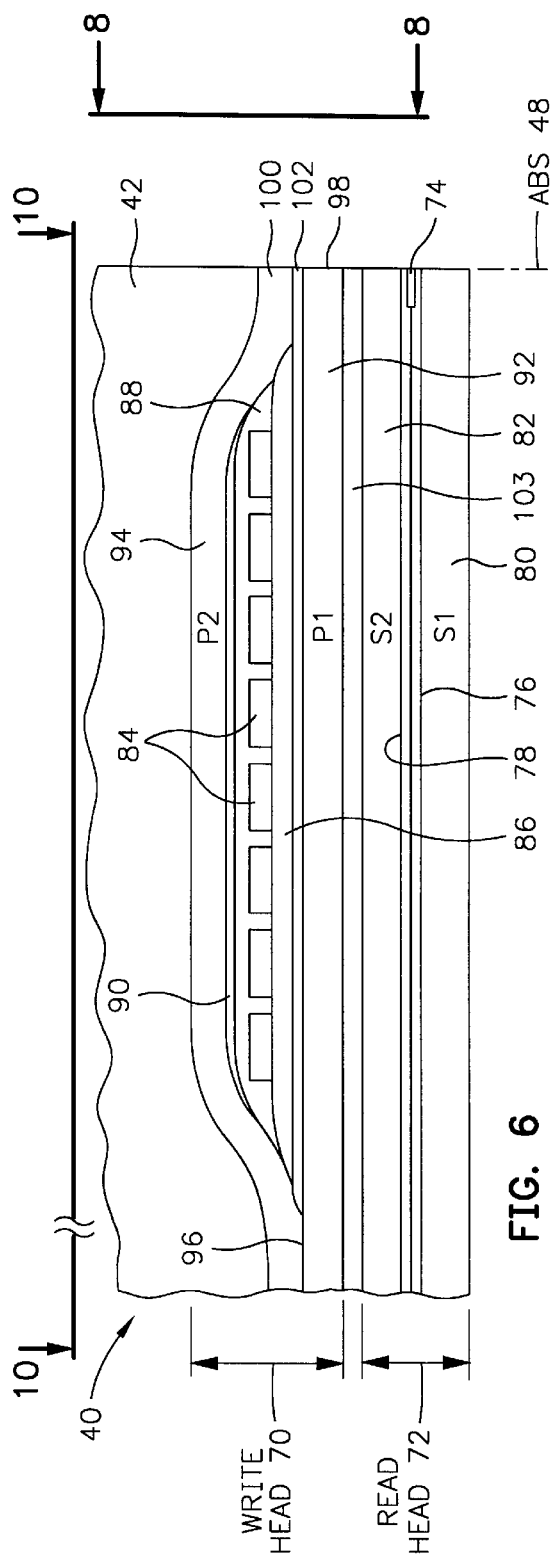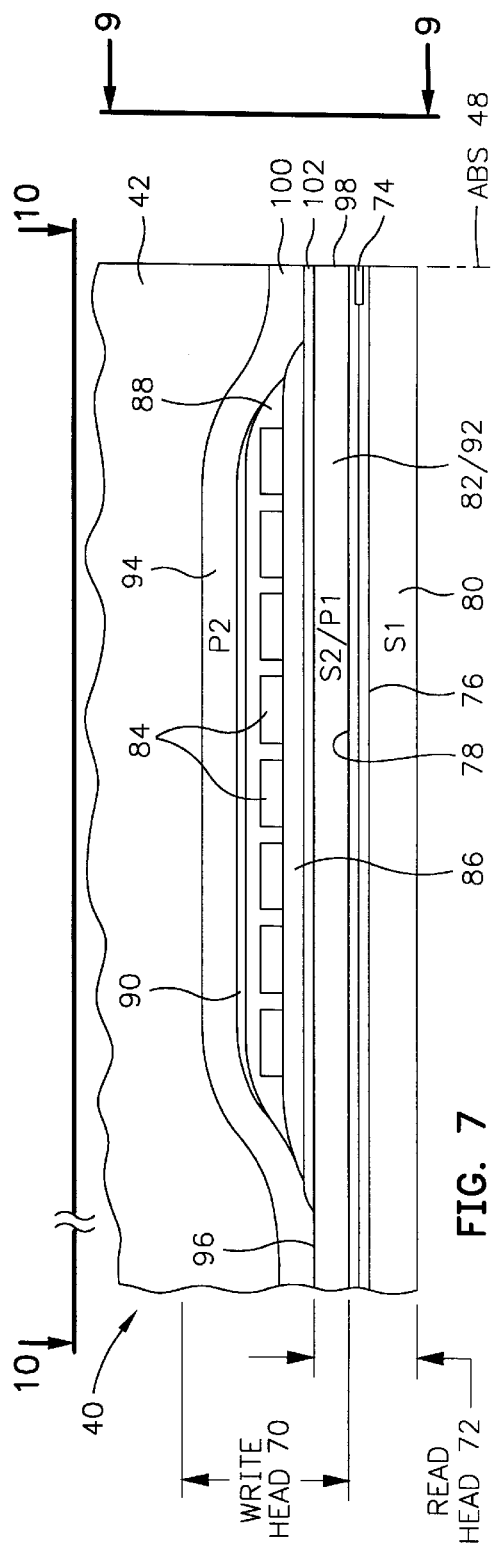

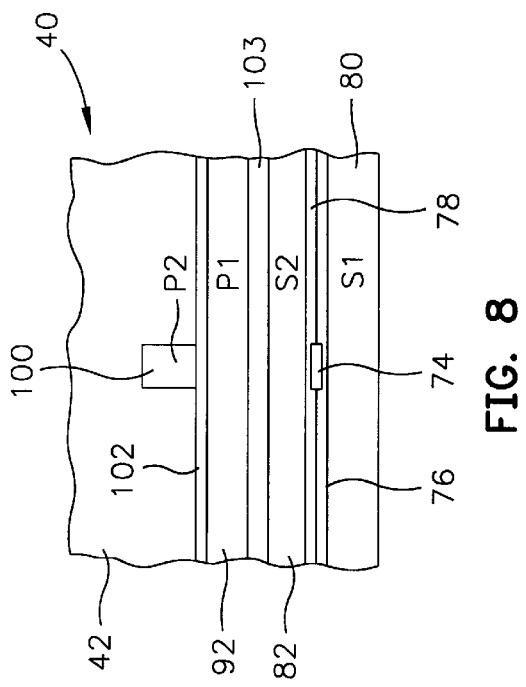
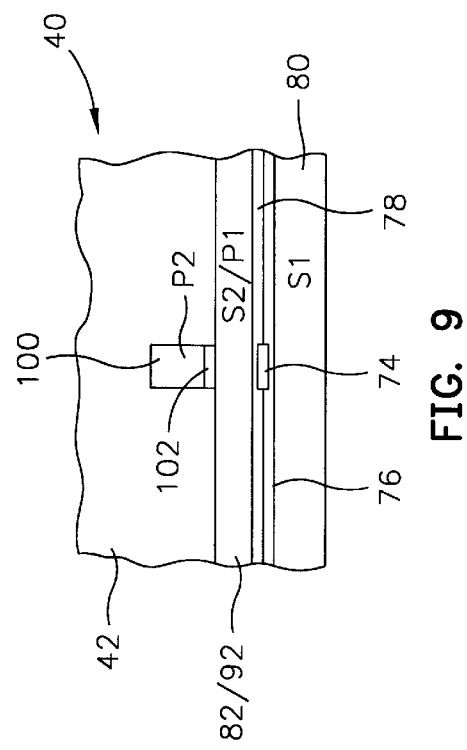
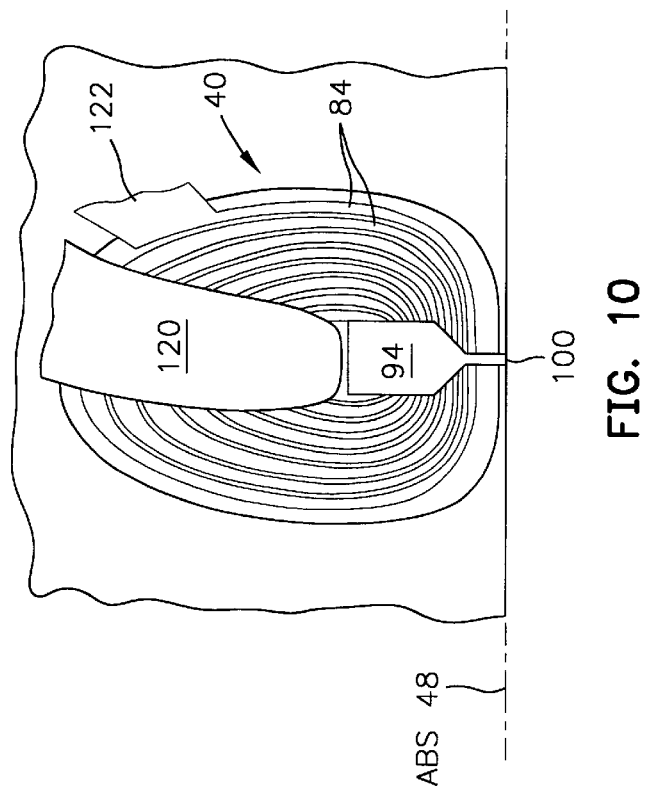
FIG. 8
FIG. 9
FIG. 10

(ABS)

SPIN VALVE READ SENSOR WITH SPECULAR REFLECTOR STRUCTURE BETWEEN A FREE LAYER STRUCTURE AND A KEEPER LAYER

BACKGROUND OF THE INVENTION

1. Field of the Invention

The present invention relates to a spin valve read head sensor with a specular reflector structure located between a free layer structure and a keeper layer and, more particularly, to a specular reflector structure which reflects conduction electrons toward the free layer for increasing a spin valve effect of the sensor.

2. Description of the Related Art

An exemplary high performance read head employs a spin valve sensor for sensing magnetic fields on a moving magnetic medium, such as a rotating magnetic disk or a linearly moving magnetic tape. The sensor includes a non-magnetic electrically conductive first spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) which is an exposed surface of the sensor that faces the magnetic medium. First and second leads are connected to the spin valve sensor for conducting a sense current therethrough. The magnetic moment of the free layer is free to rotate in positive and negative directions from a quiescent or zero bias point position in response to positive and negative magnetic signal fields from a moving magnetic medium. The quiescent position is the position of the magnetic moment of the free layer when the sense current is conducted through the sensor without magnetic field signals from a rotating magnetic disk. The quiescent position of the magnetic moment of the free layer is preferably parallel to the ABS. If the quiescent position of the magnetic moment is not parallel to the ABS the positive and negative responses of the free layer will not be equal which results in read signal asymmetry which is discussed in more detail hereinbelow.

The thickness of the spacer layer is chosen to be less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of cos θ, where θ is the angle between the magnetic moments of the pinned and free layers. This resistance, which changes when there are changes in scattering of conduction electrons, is referred to in the art as magnetoresistance (MR). Magnetoresistive coeffecient is dr/R where dr is the change in magnetoresistance of the spin valve sensor from minimum magnetoresistance (magnetic moments of free and pinned layers parallel) and R is the resistance of the spin valve sensor at minimum magnetoresistance. For this reason a spin valve sensor is sometimes referred to as a giant magnetoresistive (GMR) sensor. A spin valve sensor has a significantly higher magnetoresistive (MR) coefficient than an anisotropic magnetoresistive (AMR) sensor which does not employ a pinned layer. GMR sensors simultaneously manifest both AMR and GMR effects, so that the output signal is a superposition of the AMR signal on the GMR signal.

The transfer curve (magnetoresistive coefficient dr/R or readback signal of the spin valve head versus applied signal from the magnetic disk) of a spin valve sensor is a substantially linear portion of the aforementioned function of cos θ. The greater this angle, the greater the resistance of the spin valve to the sense current and the greater the readback signal (voltage sensed by processing circuitry). With positive and negative magnetic fields from a rotating magnetic disk (assumed to be equal in magnitude), it is important that positive and negative changes of the magnetoresistance (MR) of the spin valve read head be equal in order that the positive and negative magnitudes of the readback signals are equal. When this occurs the bias point on the transfer curve is considered to be zero and is located midway between the maximum positive and negative readback signals. When the direction of the magnetic moment of the free layer is parallel to the ABS, and the direction of the magnetic moment of the pinned layer is perpendicular to the ABS in a quiescent state, the bias point is located at zero and the positive and negative readback signals will be equal when sensing positive and negative magnetic fields from the magnetic disk. The readback signals are then referred to in the art as having symmetry about the zero bias point. When the readback signals are not equal the readback signals are asymmetric.

The location of the bias point on the transfer curve is influenced by five major forces on the free layer, namely a ferromagnetic coupling field ($H_{FC}$) between the pinned layer and the free layer, a demag field ($H_{demag}$) from the pinned layer, demagnetization (demag) field of the free layer acting on itself, sense current fields ($H_{SC}$) from all conductive layers of the spin valve except the free layer, and the superposition of the AMR signal on the GMR signal. The influence of the AMR effect on the bias point is also defined in terms of magnitude and direction.

When the sense current is conducted through the spin valve sensor, the pinning layer (if conductive), the pinned layer and the first spacer layer, which are all on one side of the free layer, impose sense current fields on the free layer that rotate the magnetic moment of the free layer toward a first direction perpendicular to the ABS. In addition, the pinned layer demagnetization field further rotates the magnetic moment of the free layer toward the first direction counteracted by a ferromagnetic coupling field $H_F$ of the pinned layer that rotates the magnetic moment of the free layer toward a second direction antiparallel to the first direction.

It is desirable to employ a ferromagnetic keeper layer on an opposite side of the free layer from the pinned layer with a nonmagnetic electrically conductive second spacer layer therebetween. The keeper layer imposes a demagnetizing field and a sense current field on the free layer that is in an opposite direction to the aforementioned first direction so as to counterbalance the pinned layer demagnetizing field and the sense current fields from the pinning layer (if conductive), the pinned layer and the first spacer layer.

Unfortunately, in any practical sensor scheme the combination of the sense current and demagnetization fields is greater than the ferromagnetic coupling field which results in read signal asymmetry. A reduced net demagnetization field on the free layer is needed to promote read signal symmetry.

In order to reduce or even eliminate the effect of the demagnetization field of the pinned layer on the bias point of the free layer, a ferromagnetic keeper layer is provided on an opposite side of the free layer from the pinned layer with a nonmagnetic electrically conductive spacer layer between the free layer and the keeper layer. With this arrangement the keeper layer provides a flux path for the demagnetization field of the pinned layer and, in turn, the pinned layer provides a flux path for the demagnetization field of the keeper layer. Consequently, the keeper and pinned layers provide a closed loop for the demagnetization fields coming from both of these layers so that the demagnetization fields are not imposed on the free layer to influence its bias point. It is important that the magnetic moment of the keeper layer be oriented antiparallel to the orientation of the magnetic moment of the pinned layer. This can be assured by directing the sense current in a proper direction through the spin valve sensor so that sense current fields urge the magnetic moment of the keeper layer to be antiparallel to the magnetic moment of the pinned layer. An additional benefit of the keeper layer is that it exerts a sense current field on the free layer that is in an opposite direction to the aforementioned first direction so as to counterbalance the sense current fields from the pinning layer, if it is conductive, the first spacer layer and the pinned layer, on the free layer. Still another benefit of the keeper layer is that it exerts a ferromagnetic coupling field on the free layer that is antiparallel to the ferromagnetic coupling field exerted on the free layer by the pinned layer. The aforementioned benefits allow the pinned layer to be made thicker so as to increase the magnetoresistive coeffecient (dr/R) of the sensor.

Efforts continue to increase the magnetoresistance coefficient (dr/R) of spin valve sensors. An increase in the magnetoresistive coefficient equates to a higher bit density (bits/square inch of the rotating magnetic disk) read by the read head. Promoting read signal symmetry of the free layer is an important factor. These kind of efforts have increased the storage capacity of computers from kilobytes to megabytes to gigabytes.

SUMMARY OF THE INVENTION

A typical second spacer layer between the free layer and the keeper layer is composed of tantalum (Ta). I have found that a significant amount of conduction electrons is lost through the tantalum (Ta) spacer layer into the keeper layer from the mean free path of conduction electrons provided by the first spacer layer between the free layer and the pinned layer. This loss is referred to in the art as diffusion of conduction electrons which reduces the scattering events of the conduction electrons in the mean free path of conduction electrons which, in turn, reduces the magnetoresistive coefficient (dr/R). I have found that by placing a specular reflector layer between the free layer and the keeper layer conduction electrons will be reflected back into the mean free path of conduction electrons for increasing the scattering events and increasing the magnetoresistive coefficient (dr/R). In a preferred embodiment the specular reflector is a bilayer structure which has first and second specular reflecting layers with the first specular reflector layer interfacing the free layer and the second specular reflector layer interfacing the keeper layer. In a still further preferred embodiment the first specular reflector layer is copper (Cu) and the second specular reflector layer is silver (Ag). With this arrangement the magnetoresistive coefficient (dr/R) can be improved by 37% as compared to a spacer layer of tantalum (Ta) between the free layer and the keeper layer. The invention also provides for improved specular reflector layer structures which employ various combinations of materials from the group comprising gold (Au), silver (Ag) and copper (Cu). An additional benefit of the specular reflector structure is that a sense current field therefrom counterbalances sense current fields from the pinned layer and the spacer layer located between the free layer and the pinned layer.

An object of the present invention is to provide an improved magnetoresistive coefficient (dr/R) for a spin valve sensor that employs a keeper layer.

Another object is to provide a specular reflector structure between the free layer and a keeper layer which improves the magnetoresistive coefficient (dr/R) of the spin valve sensor and counterbalances sense current fields from a pinned layer and a spacer layer on a free layer of the spin valve sensor.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

FIG. 8 is a partial ABS view of the slider taken along plane 8—8 of FIG. 6 to show the read and write elements of the piggyback magnetic head;

FIG. 9 is a partial ABS view of the slider taken along plane 9—9 of FIG. 7 to show the read and write elements of the merged magnetic head;

FIG. 10 is a view taken along plane 10—10 of FIGS. 6 or 7 with all material above the coil layer and leads removed;

DESCRIPTION OF THE PREFERRED EMBODIMENTS

Magnetic Disk Drive

Figure 1:
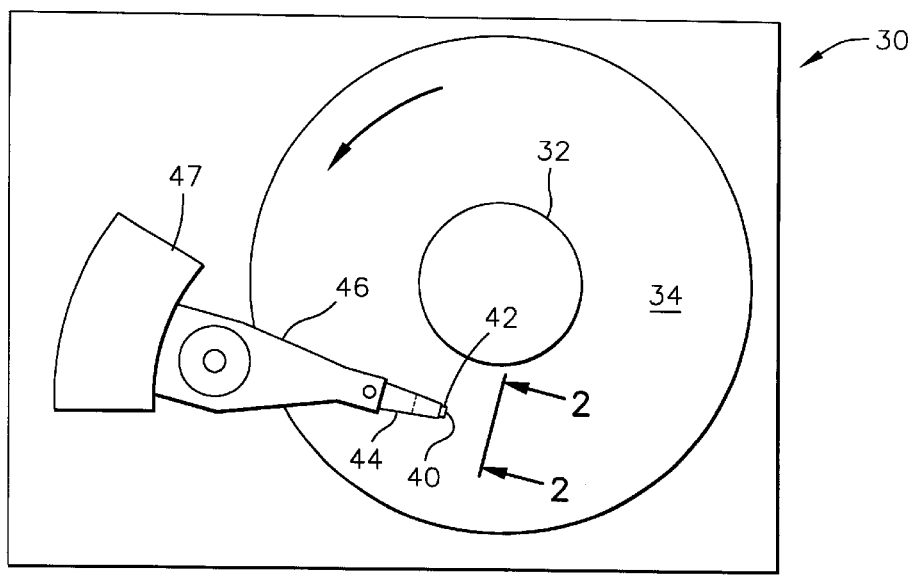
FIG. 1 is a plan view of an exemplary magnetic disk drive.
Figure 2:
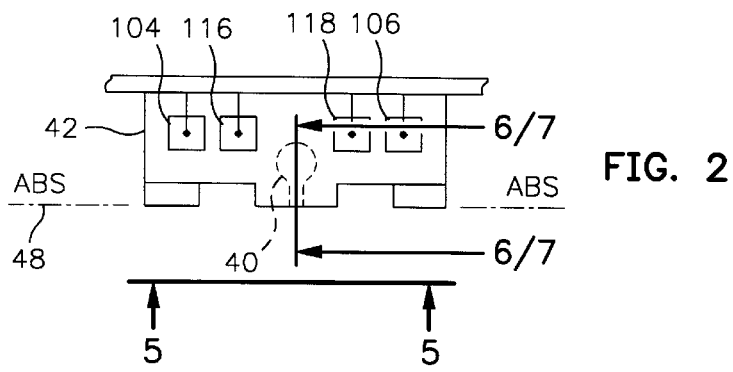
FIG. 2 is an end view of a slider with a magnetic head of the disk drive as seen in plane 2—2.
Figure 3:
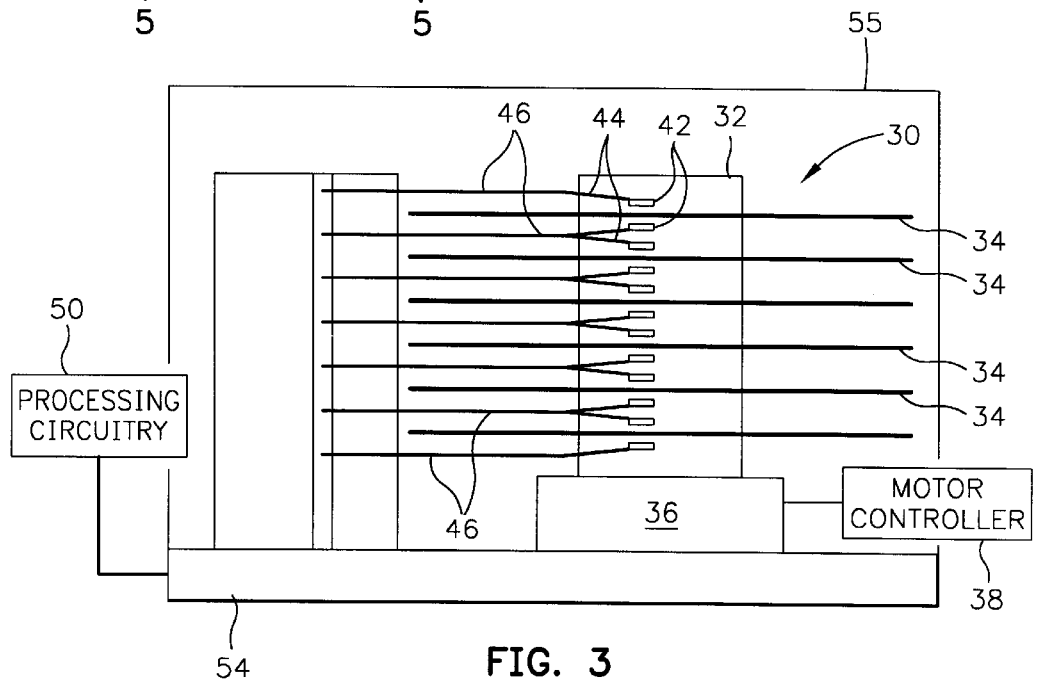
FIG. 3 is an elevation view of the magnetic disk drive wherein multiple disks and magnetic heads are employed.
Figure 4:
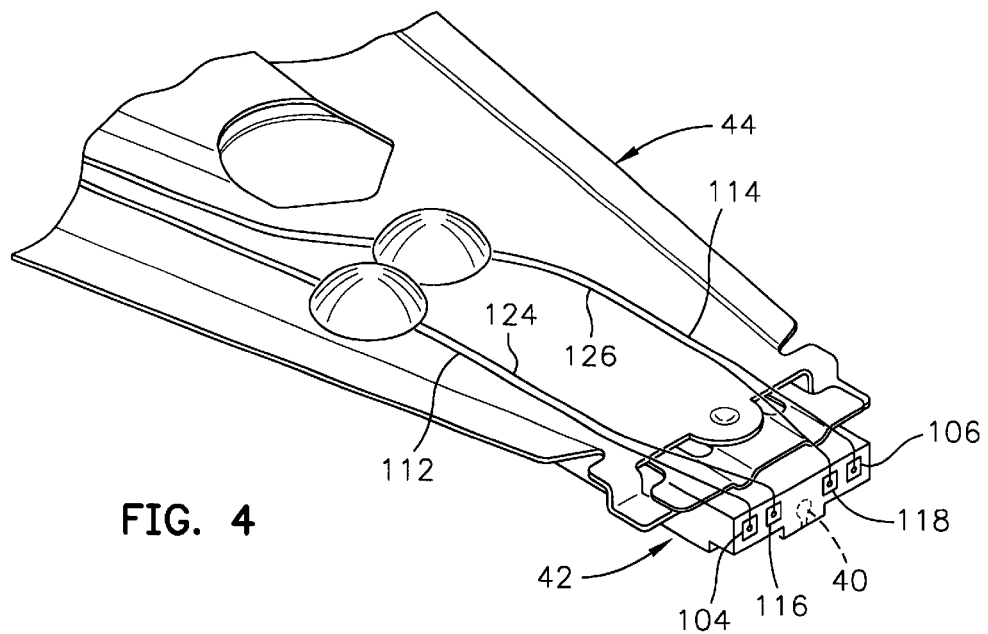
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A combined read and write magnetic head 40 is mounted on a slider 42 that is supported by a suspension 44 and actuator arm 46 which is rotatably positioned by an actuator 47. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals to the actuator 47 for moving the slider to various tracks. In FIG. 4 the slider 42 is shown mounted to a suspension 44. The components described hereinabove may be mounted on a frame 54 of a housing, as shown in FIG. 3.

Figure 5:
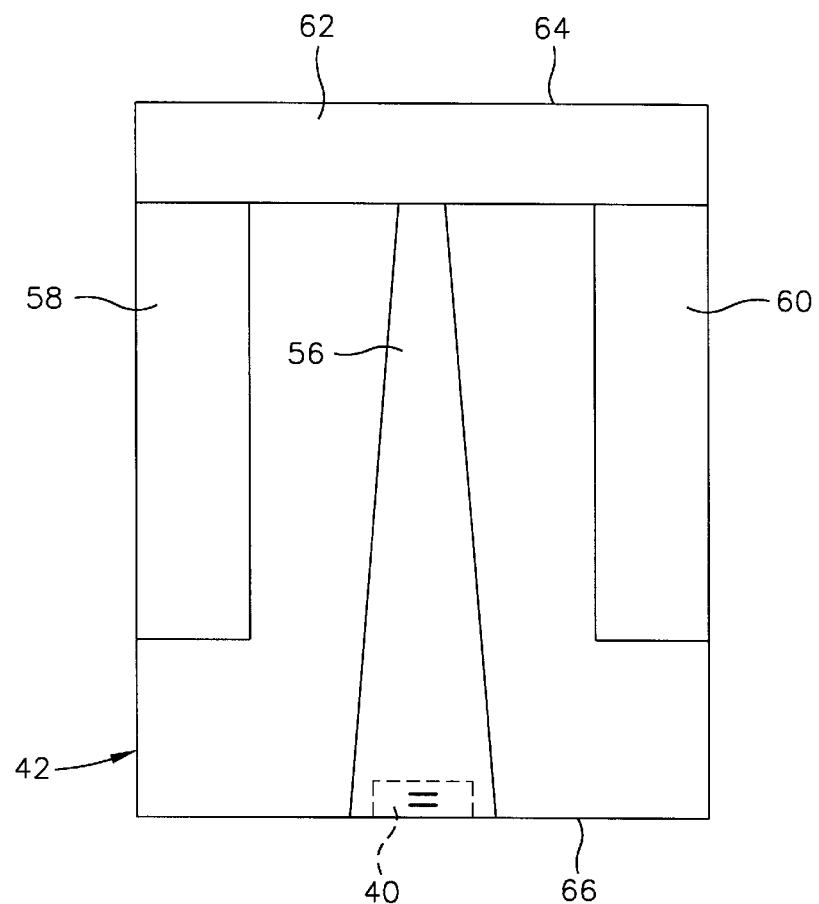
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94.

The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
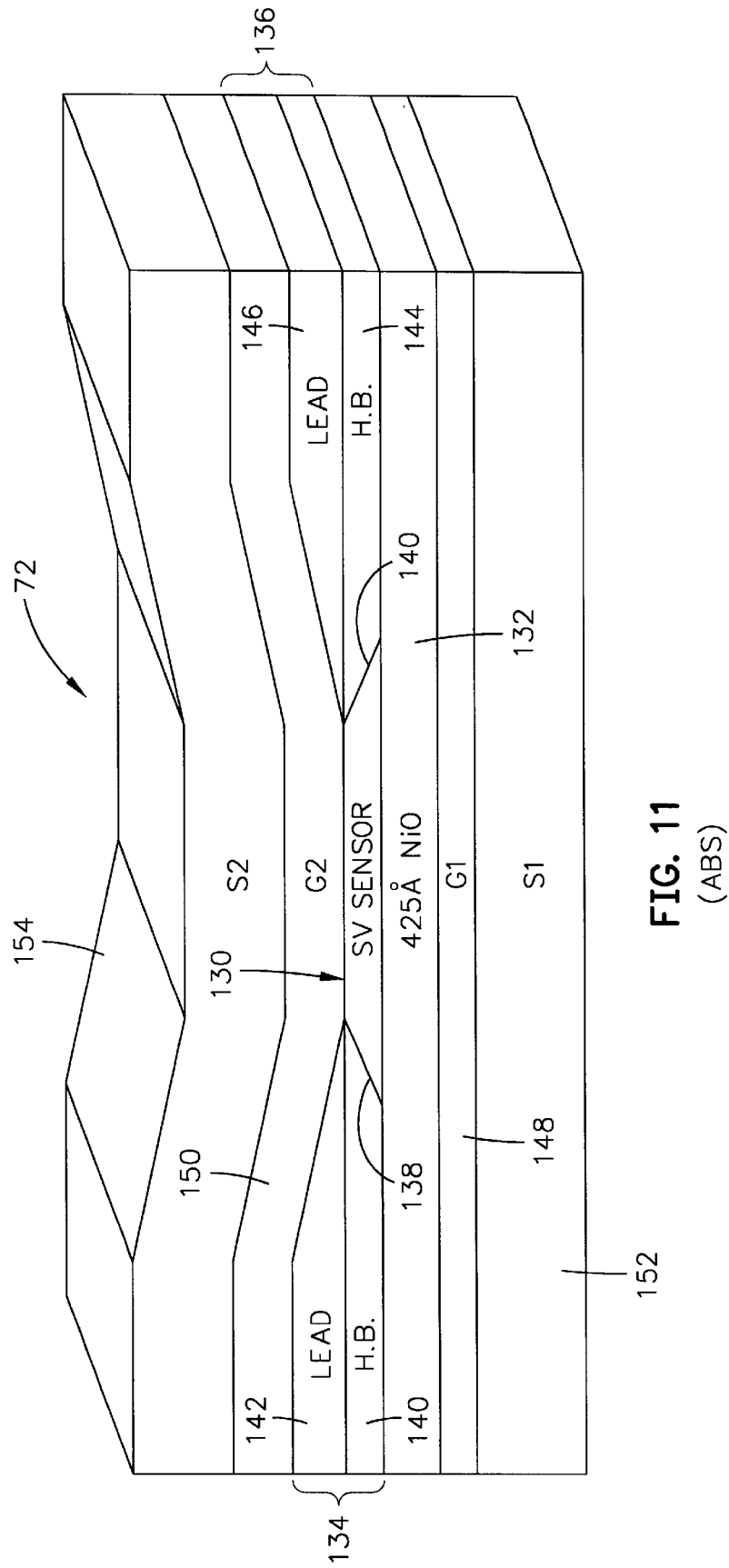
FIG. 11 is an isometric ABS illustration of a read head which employs a spin valve (SV) sensor.

FIG. 11 is an isometric ABS illustration of the read head 72 shown in FIG. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, has a magnetic moment that is pinned by the magnetic spins of the pinning layer 132. The AFM pinning layer may be 425 Å of nickel oxide (NiO). First and second hard bias and lead layers 134 and 136 are connected to first and second side edges 138 and 140 of the spin valve sensor. This connection is known in the art as a contiguous junction. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

Spin Valve Sensor with Keeper Layer

Figure 12:
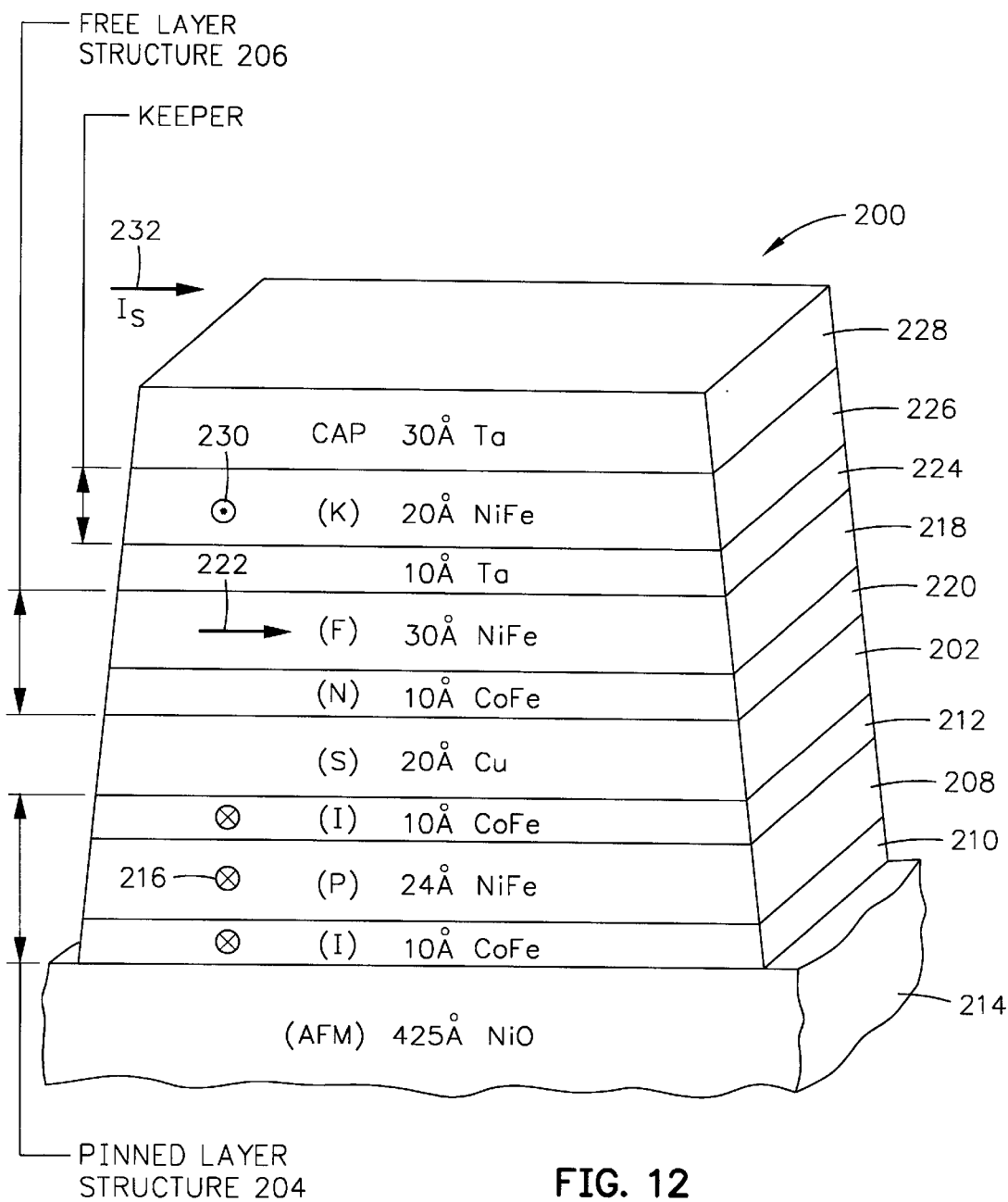
FIG. 12 is an ABS illustration of a prior art spin valve sensor with a keeper layer (K)

A spin valve sensor 200 with a keeper layer, which was investigated by me, is schematically illustrated in FIG. 12. This sensor includes a nonmagnetic first spacer layer (S) 202 which is located between a pinned layer structure 204 and a free layer structure 206. The pinned layer structure 204 may include a pinned layer (P) 208 which is located between first and second interlayers (I) 210 and 212. The pinned layer structure 204 is exchange coupled to an antiferromagnetic AFM pinning layer 214 which pins a magnetic moment 216 of the pinned layer in a first direction which is typically perpendicular to the ABS in a direction either toward the ABS or away from the ABS, as shown in FIG. 12. Since the interlayers 210 and 212 are exchange coupled to the pinned layer 208, their magnetic moments are oriented in the same direction. The free layer structure 206 includes a free layer (F) 218 and a nanolayer (N) 220 with the nanolayer 220 being located between and interfacing the spacer layer 202 and the free layer 218. The nanolayer increases the magnetoresistive coefficient (dr/R) when the free layer 218 is nickel iron (NiFe). The nanolayer 220 maybe cobalt iron (CoFe) and the spacer layer 202 may be copper (Cu). The free layer 218 has a magnetic moment 222 which is preferably parallel to the ABS, either from right to left or left to right, as shown in FIG. 12. The rotation of the magnetic moment 222 of the free layer, in response to applied signal fields from a rotating magnetic disk relative to the magnetic moment 216 of the pinned layer, increases or decreases the magnetoresistance (MR) of the spin valve sensor which causes a change in potential in a sense current $I_S$ circuit so that processing circuitry can process the potential changes as read back signals.

In the spin valve sensor 200 a nonmagnetic second spacer layer 224 is located between the free layer 218 and a keeper layer 226. A cap layer 228 is located on the keeper layer 226 for its protection. The keeper layer 226 has a magnetic moment 230 which is antiparallel to the magnetic moment 216 of the pinned layer. If a sense current $I_S$ 232 is directed from left to right, as shown in FIG. 12, sense current fields from the conductive layers other than the keeper layer will urge the magnetic moment 230 of the keeper layer to be oriented perpendicular to and toward the ABS while sense current fields from conductive layers other than the pinned layer structure 204 will support pinning of the magnetic moment 216 of the pinned layer structure perpendicular to and away from the ABS, as shown in FIG. 12.

Figure 13:
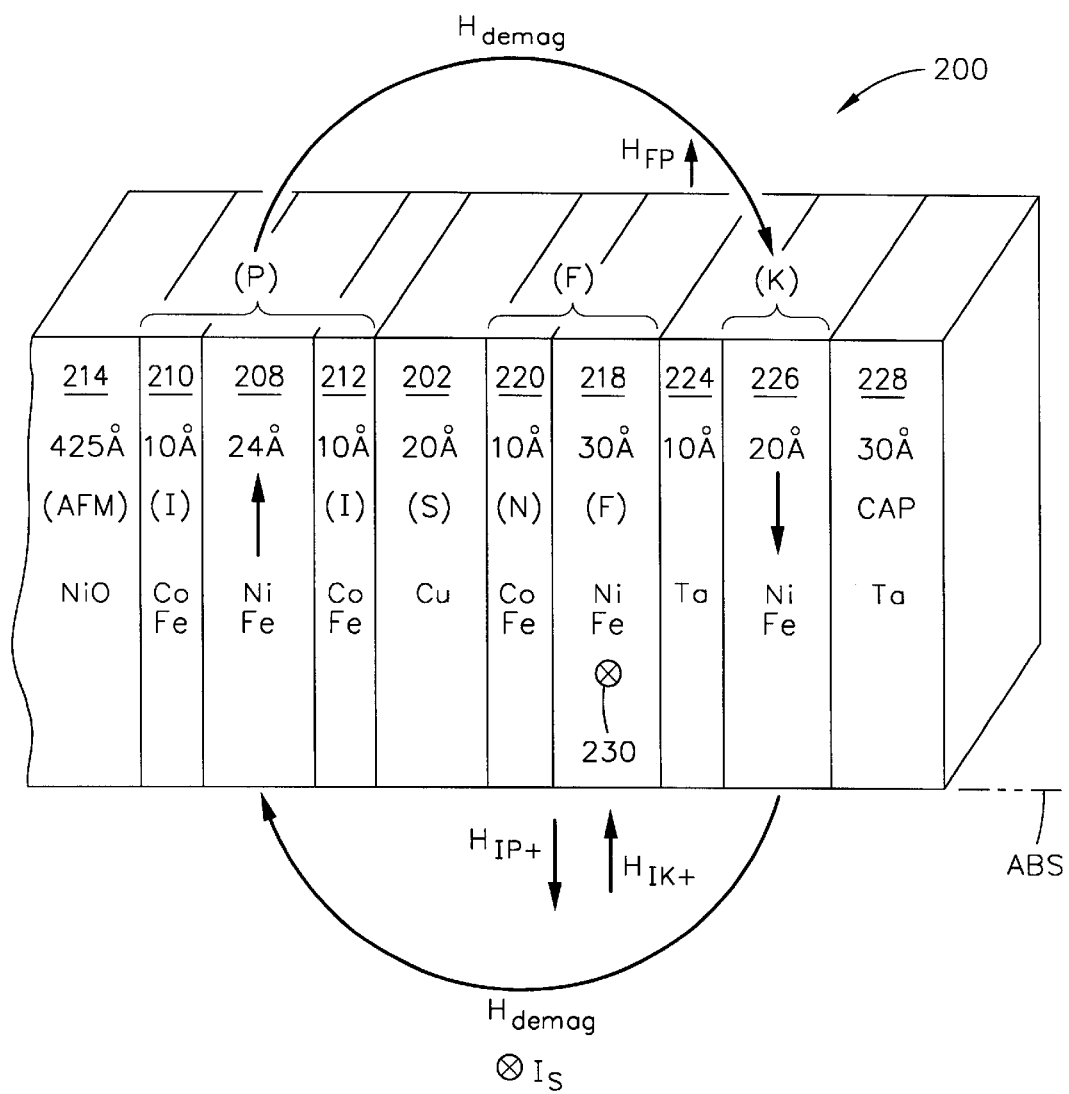
FIG. 13 is an ABS illustration of the spin valve sensor shown in FIG. 12 rotated 90° clockwise and rotated 90° toward the viewer.

The main purpose of the keeper layer 226 is to reduce the effect of the demagnetization field of the pinned layer structure 204 on the free layer structure, as shown in FIG. 13. Without the keeper layer 226 the demagnetization field from the pinned layer structure 204 exerts a field on the magnetic moment 230 of the free layer structure urging it to be directed downwardly away from a parallel position to the ABS. The keeper layer 226 provides a flux path for the demagnetization field of the pinned layer structure and the pinned layer structure provides a flux path for the demagnetization field of the keeper layer so that the demagnetization fields from the keeper layer 226 and the pinned layer structure 204 have a closed loop relationship. If the keeper layer is provided with a proper thickness the demagnetization field of the pinned layer structure 204 will have no effect on the bias point of the free layer structure. Still further, the keeper layer 226 provides a sense current field $H_{IK}$ on the free layer structure which is antiparallel to a sense current field $H_{IP}$ exerted on the free layer structure by the pinned layer structure. The plus (+) indications on the sense current fields in FIG. 13 indicate that there are other layers exerting sense current fields on the free layer. A ferromagnetic coupling field $H_{FP}$ is also exerted on the free layer structure by the pinned layer structure (P) as shown in FIG. 13.

It is desirable that the keeper layer 226 have a high resistance so that the amount of sense current shunted is small. This will permit an increase in the magnetoresistive coefficient dr/R of the sensor so as to increase storage capacity of the disk drive. The keeper layer 226 should also have a high magnetic moment to minimize its thickness to further reduce current shunting and to reduce the read gap. It is further desirable that the keeper layer have soft magnetic properties (low intrinsic uniaxial anisotropy ($H_K$)) so that when the sense current is conducted through the sensor its magnetic moment will be perpendicular to the ABS in a quiescent state (no field signal from the rotating magnetic disk). The intrinsic unidirectional uniaxial anisotropy field ($H_K$) is the amount of applied field required to rotate the magnetic moment of the keeper layer 226 from its easy axis (no applied field) to a position 90° to the easy axis. Low uniaxial anisotropy is desirable so that the magnetic moment of the keeper layer 226 can be easily rotated to the desired direction perpendicular to the ABS should the easy axis of the keeper layer be non-perpendicular to the ABS. Even though the easy axis of the keeper layer 226 may be constructed perpendicular to the ABS an asperity on a rotating magnetic disk or fields from electrical pulses through the sensor, such as electrostatic discharge (ESD) during manufacture or in the disk drive, can heat the sensor to a temperature in the presence of magnetic field that causes the easy axis to be reoriented nonperpendicular to the ABS. If the keeper 226 layer has a high uniaxial anisotropy the sense current fields from the other conducting layers may not be sufficient to rotate the magnetic moment of the keeper layer to the desired direction perpendicular to the ABS. When the magnetic moment of the keeper layer 226 is not perpendicular to the ABS a component of its demagnetizing field is parallel to the ABS which reduces the counterbalancing effect of the keeper layer on the free layer structure 206.

A preferred pinning layer 214 is 425 Å of nickel oxide (NiO). Other suitable pinning layers may be composed of alpha iron oxide ($\alpha Fe_2O_3$), iron manganese (FeMn), platinum manganese (PtMn) or iridium manganese (IrMn). If the pinning layer is iridium manganese (IrMn) the thickness may be 80 Å. Typical thicknesses of the layers are 10 Å of cobalt iron (CoFe) for the interlayer 210, 24 Å of nickel iron (NiFe) for the pinned layer 208, 10 Å of cobalt iron (CoFe) for each of the interlayers 210 and 212, 20 Å of copper (Cu) for the spacer layer 202, 10 Å of cobalt iron (CoFe) for the nanolayer 220, 30 Å of nickel iron (NiFe) for the free layer 218, 10 Å of tantalum (Ta) 224 for the second spacer layer 224, 34 Å of nickel iron (NiFe) for the keeper layer 226 and 30 Å of tantalum (Ta) for the cap 228.

As stated hereinabove the spin valve sensor 200 employs a tantalum spacer layer 224 between the free layer 218 and the keeper layer 226. I have found that the tantalum spacer layer 224 permits conduction electrons to be lost from the mean free path of conduction electrons provided by the copper spacer layer 202 between the free layer structure 206 and the pinned layer structure 204. These conduction electrons are lost into the nickel iron (NiFe) keeper layer 226 and are no longer involved in scattering events in the mean free path for producing the spin valve effect. Therefore, some of the magnetoresistive coefficient (dr/R) in response to rotation of the magnetic moment 222 of the free layer with respect to the magnetic moment 216 of the pinned layer structure 204 is lost. It is the purpose of my invention to overcome the loss of conduction electrons so as to increase the magnetoresistive coefficient (dr/R) of the spin valve sensor.

The Invention

Figure 14:
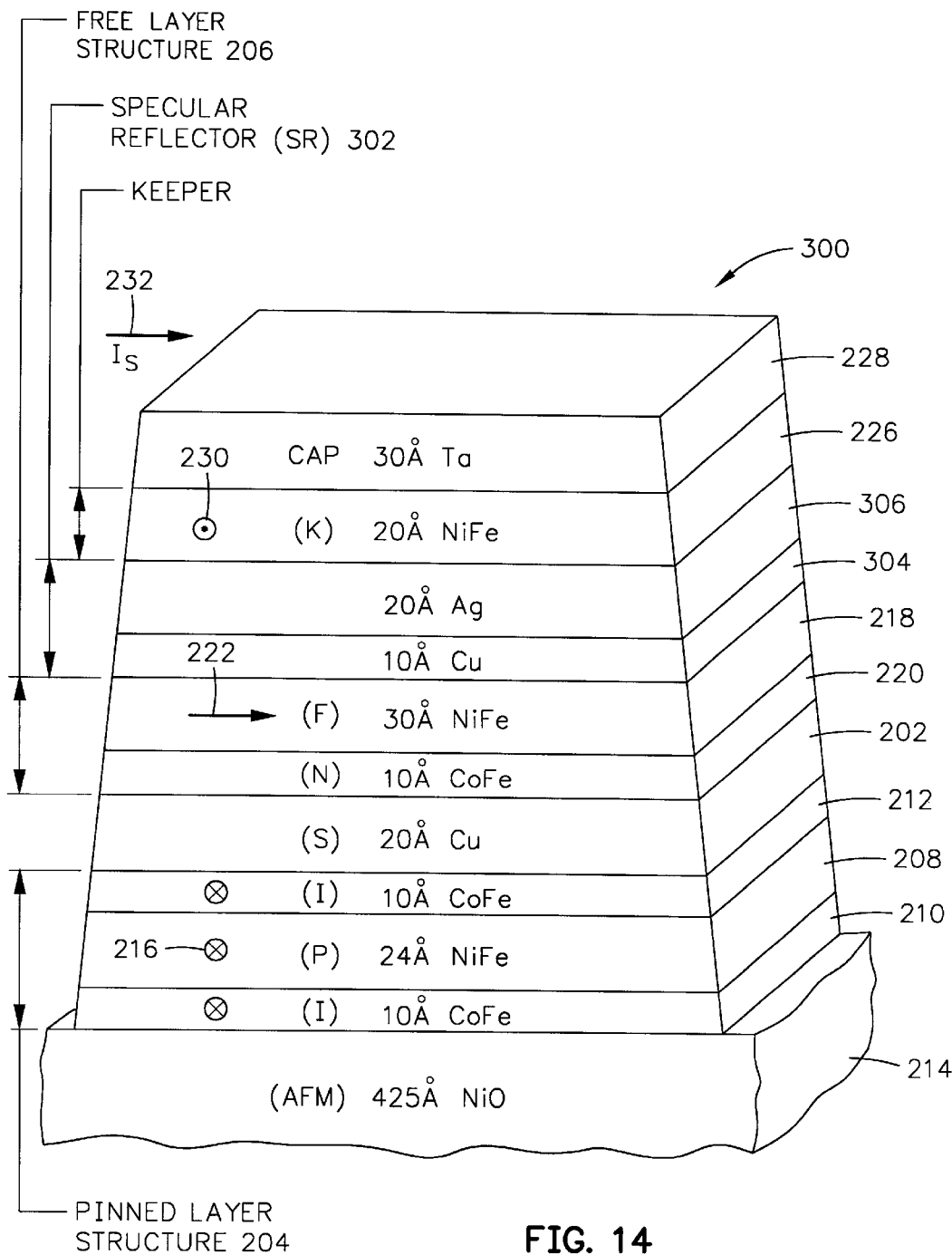
FIG. 14 is an ABS illustration of a first embodiment of the present spin valve sensor with a specular reflector structure between a keeper layer and a free layer.
Figure 15:
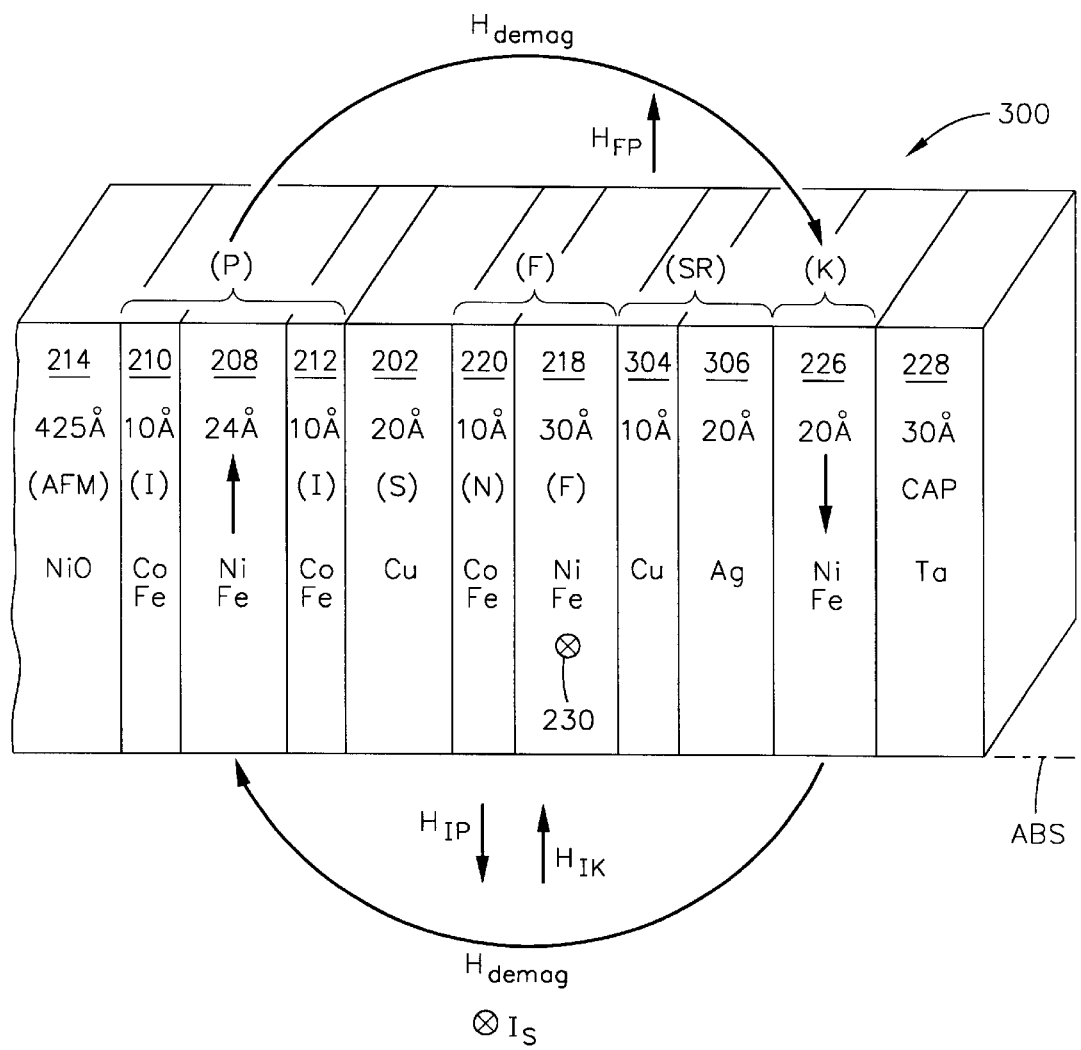
FIG. 15 is an ABS illustration of the spin valve sensor in FIG. 14 rotated 90°; clockwise and rotated 90° toward the viewer.

A preferred and first embodiment of the present spin valve sensor 300 is shown in FIGS. 14 and 15. The spin valve sensor 300 in FIG. 14 has the same layers and materials as the spin valve sensor 200 shown in FIG. 12 except for a specular reflector structure 302 which is located between the free layer structure 206 and the keeper layer 226. The specular reflector structure 302 is a bilayer specular reflector structure which has first and second specular reflector layers 304 and 306 with the first specular reflector layer 304 interfacing the free layer 218 and the second specular reflector layer 306 interfacing the keeper layer 226. The first specular reflector layer 304 is preferably 10 Å of copper (Cu) and the second specular reflector layer is preferably 20 Å of silver (Ag). The first specular reflector layer 304 is copper (Cu) because of its compatibility with the nickel iron (NiFe) of the free layer 218. The second specular reflector layer of silver (Ag) has a high capability of reflecting conduction electrons toward the free layer 218. Accordingly, the copper (Cu) of the first specular reflector layer 304 provides the required compatability with the nickel iron (NiFe) of the free layer 218 and the silver (Ag) of the second specular reflector layer 306 reflects the conduction electrons toward the free layer 218 to increase the magnetoresistive coefficient (dr/R). The increase in magnetoresistive coefficient (dr/R) of the spin valve sensor 300, shown in FIG. 14, is 37% greater than the magnetoresistive coefficient (dr/R) of the spin valve sensor 200 shown in FIG. 12.

FIG. 15 shows an ABS illustration looking at the left end of the spin valve sensor 300 in FIG. 14. There is a closed loop of the demagnetization fields of the pinned layer structure and the keeper layer 226. Because of the conductivity of the first and second specular reflector layers 304 and 306 the counterbalancing of the sense current fields is enhanced from that shown for the spin valve sensor in FIGS. 12 and 13. A sense current field emanates from these layers which helps to counterbalance sense current fields from the conductive layers on the opposite side of the free layer structure 206. Accordingly, the sense current fields from the first and second specular reflector layers 304 and 306 will promote read signal symmetry of the spin valve sensor.

It is desirable to keep the specular reflector layer structure 306 as thin as possible. In a preferred embodiment this thickness does not exceed 30 Å. The first specular reflector layer 304 of copper (Cu) should be as thin as possible so as to minimize shunting of the sense current $I_S$. The second specular reflector layer 306 of silver (Ag) should be thicker than the first specular reflector layer 304 for the purpose of optimizing reflection of conduction electrons. The preferred thickness for the second specular reflector layer is 20 Å.

Figure 16:
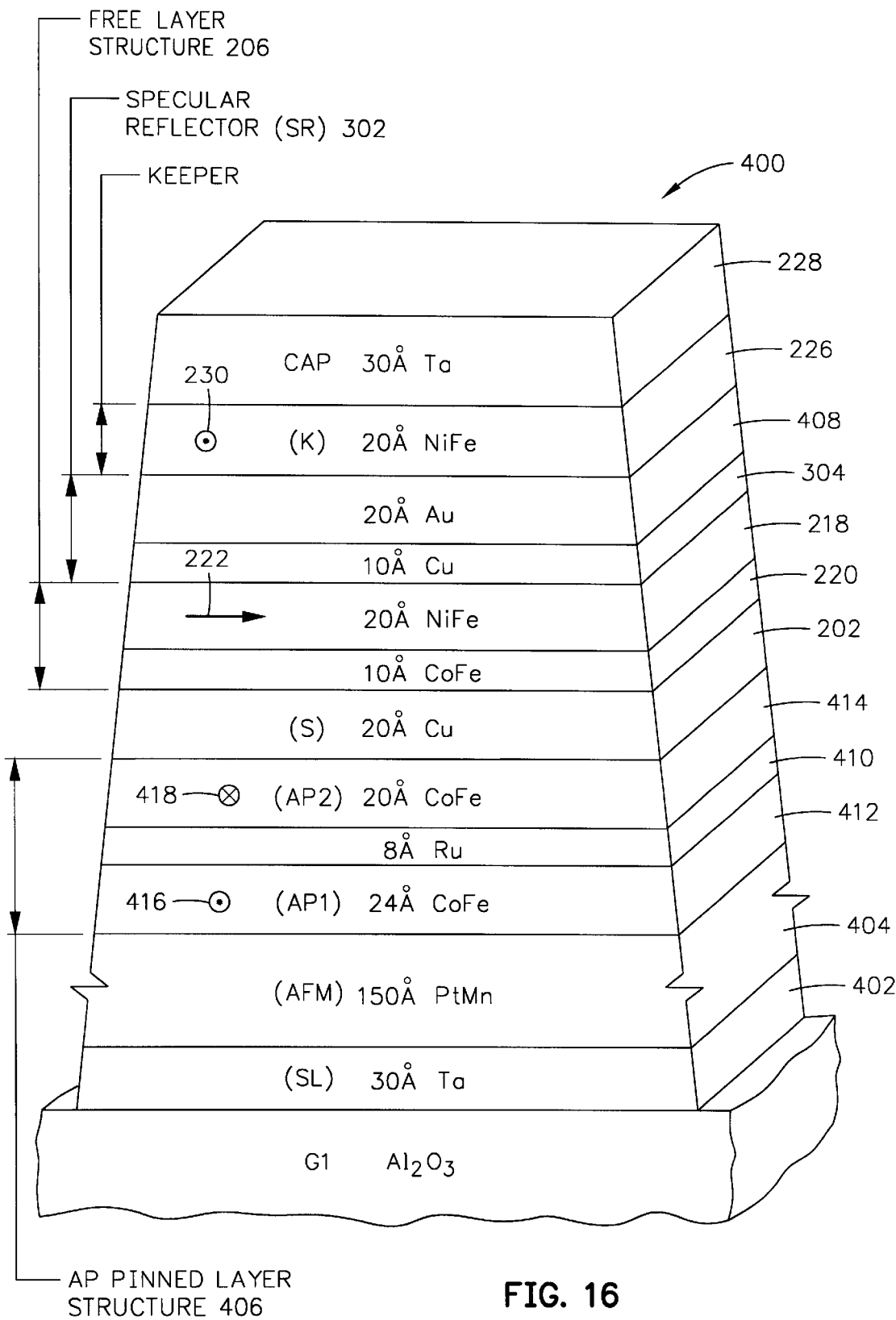
FIG. 16 is a second embodiment of the present spin valve sensor with a specular reflector structure between a keeper layer and a free layer structure.

A second embodiment of the present spin valve sensor 400 is shown in FIG. 16. The spin valve sensor 400 is the same as the spin valve sensor 300 in FIG. 14 except a seed layer (SL) 402 composed of 30 Å of tantalum (Ta) is provided, the pinning layer 404 is 150 Å of platinum manganese (PtMn), the pinned layer structure 406 is an antiparallel (AP) pinned layer structure and the second specular reflector layer 408 is 20 Å of gold (Au). The AP pinned structure 406 includes an antiparallel coupling layer 410 located between ferromagnetic first and second antiparallel layers (AP1) and (AP2) 412 and 414. The coupling layer 410 may be 8 Å of ruthenium (Ru), the first AP layer 412 may be 24 Å of cobalt iron (CoFe) and the second AP layer 414 may be 20 Å of cobalt iron (CoFe). The first AP pinned layer 412 is thicker than the second AP pinned layer 414 so that a magnetic moment 416 of the first AP pinned layer will set the magnetic spins of the pinning layer 404 in the same direction when subjected to a resetting magnetic field which is oriented perpendicular to and toward the ABS. By a strong antiparallel exchange coupling the second AP pinned layer 414 will have its magnetic moment 418 oriented antiparallel to the magnetic moment 416 of the first AP pinned layer. It is the rotation between the magnetic moment 222 of the free layer relative to the direction of the magnetic moment 418 of the second AP pinned layer that determines the change in magnetoresistance of the spin valve sensor 400. The specular reflector structure 302 of the spin valve sensor 400 operates in the same way as the specular reflector structure 302 shown for the spin valve sensor 300 in FIG. 14. However, the gold (Au) of the second specular reflector layer 408 does not reflect as many conduction electrons as the silver (Ag) of the second specular reflector layer in FIG. 14. For that reason the spin valve sensor 300 in FIG. 14 is the preferred embodiment.

Figure 17:
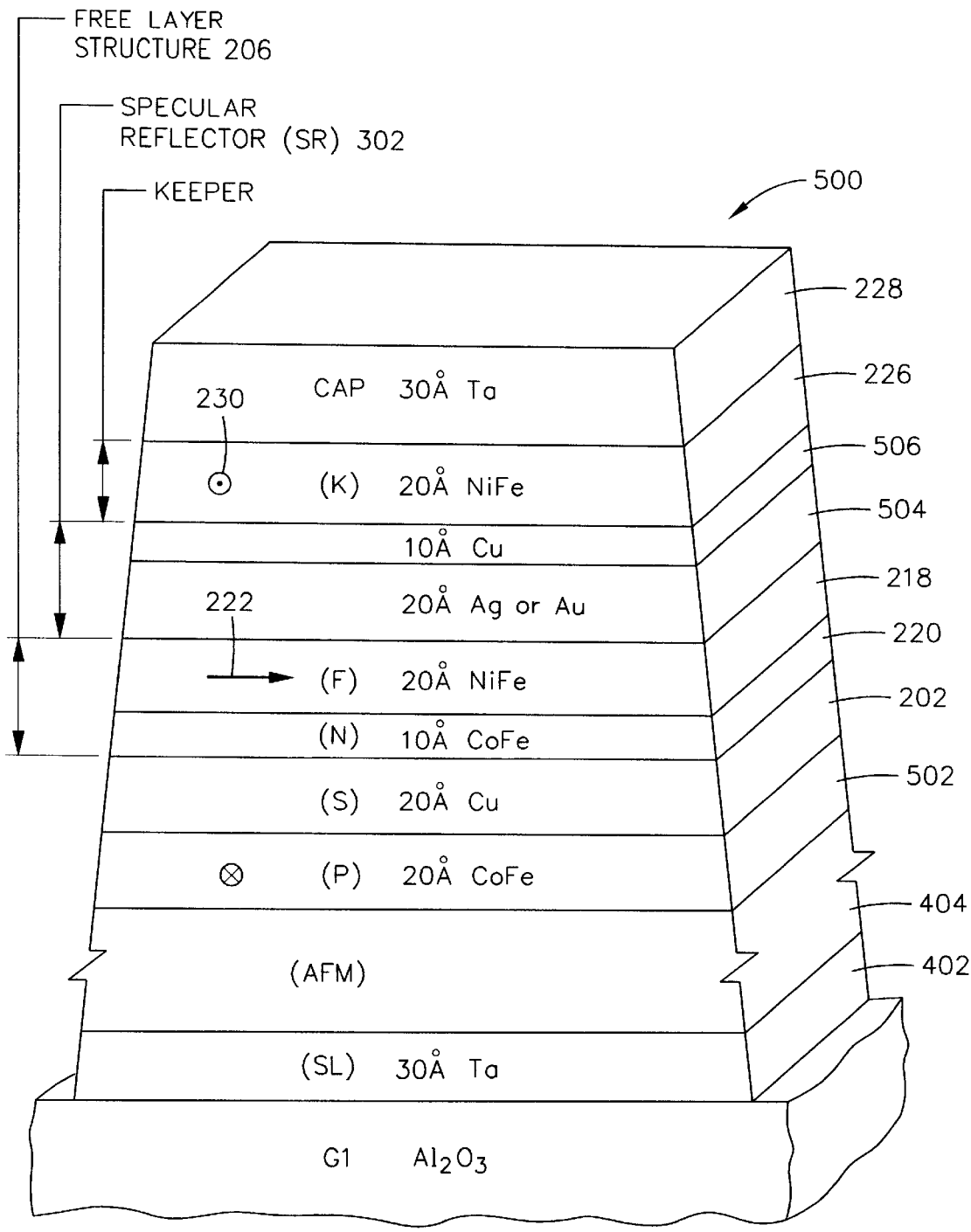
FIG. 17 is a third embodiment of the present spin valve sensor with a specular reflector structure between a keeper and a free layer structure.

A third embodiment of the present spin valve sensor 500 is shown in FIG. 17. The spin valve sensor 500 is the same as the spin valve sensor 400 in FIG. 16 except a single pinned layer (P) 502 composed of 20 Å of cobalt iron (CoFe) is employed, the first specular reflector layer 504 is composed of 20 Å of silver (Ag) or gold (Au) and the second specular reflector layer 506 is composed of 10 Å of copper (Cu). The silver (Ag) or gold (Au) of the first specular reflector layer 504 may not be as compatible with the nickel iron (NiFe) of the free layer as copper (Cu). However, the silver (Ag) or gold (Au) of the first specular reflector layer 504 will reflect conduction electrons back into the mean free path of conduction electrons and the copper (Cu) of the second specular reflector layer 506 will promote improved microstructure of the nickel iron (NiFe) of the keeper layer. The pinning layer 404 may be any conductive antiferromagnetic material, such as nickel manganese (NiMn), platinum manganese (PtMn) or iridium manganese (IrMn), or if it is a nonconductive antiferromagnetic layer, such as nickel oxide (NiO) or alpha iron oxide ($\alpha Fe_2O_3$) the tantalum (Ta) seed layer 402 may be omitted.

Figure 18:
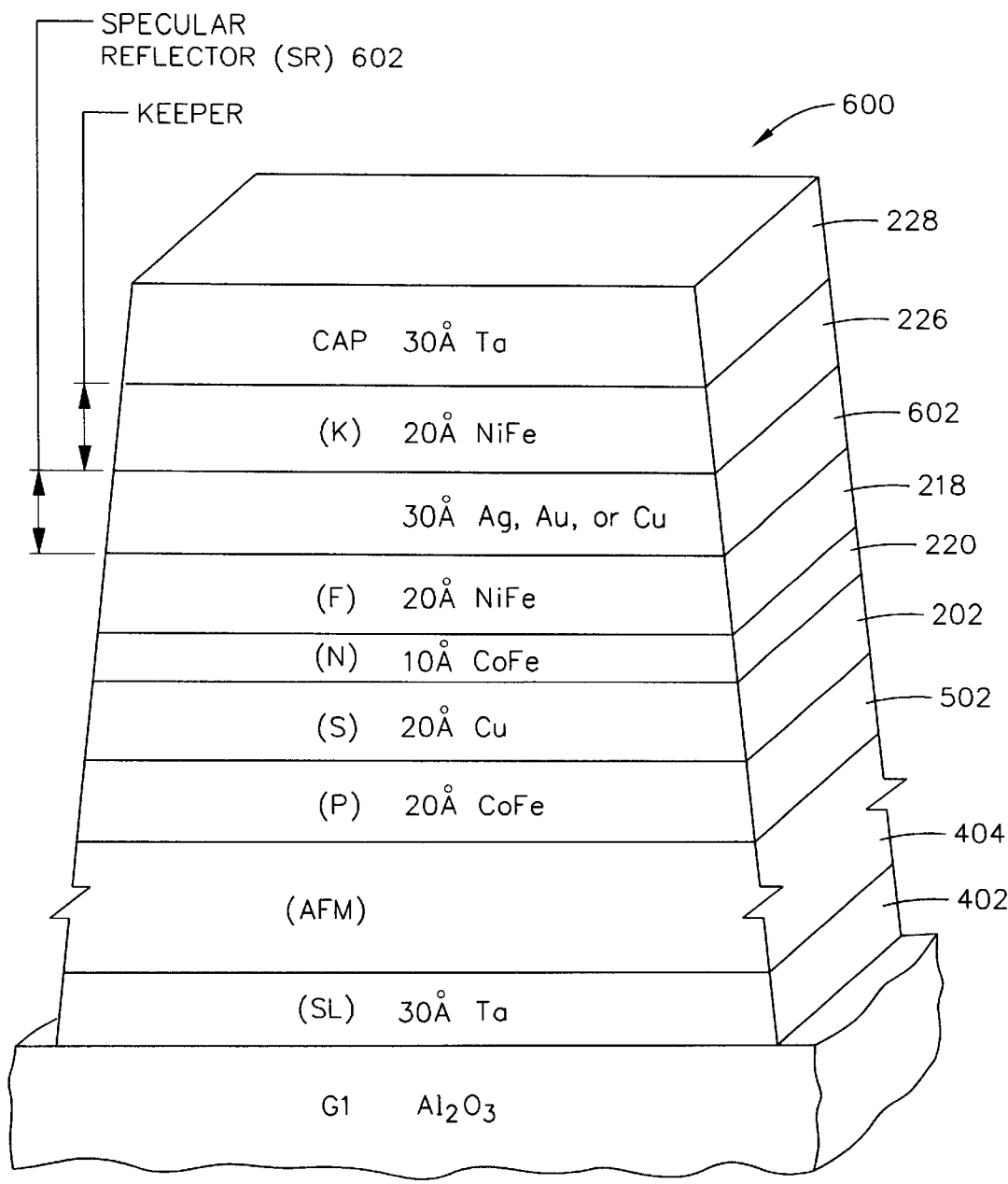
FIG. 18 is a fourth embodiment of the present spin valve sensor with a specular reflector structure between the keeper layer and a free layer structure.

A fourth embodiment of the present spin valve sensor 600 is illustrated in FIG. 18. This embodiment is the same as the embodiment 500 shown in FIG. 17 except a single specular reflector layer 602 is employed which is composed of 30 Å of silver (Ag), gold (Au) or copper (Cu). This is a broad embodiment of the present invention wherein any of these metals may be employed for a single specular reflector layer since each of these metals will cause a degree of specular reflection with silver (Ag) reflecting the most conduction electrons and copper (Cu) reflecting the least amount of conduction electrons.

Figure 19:
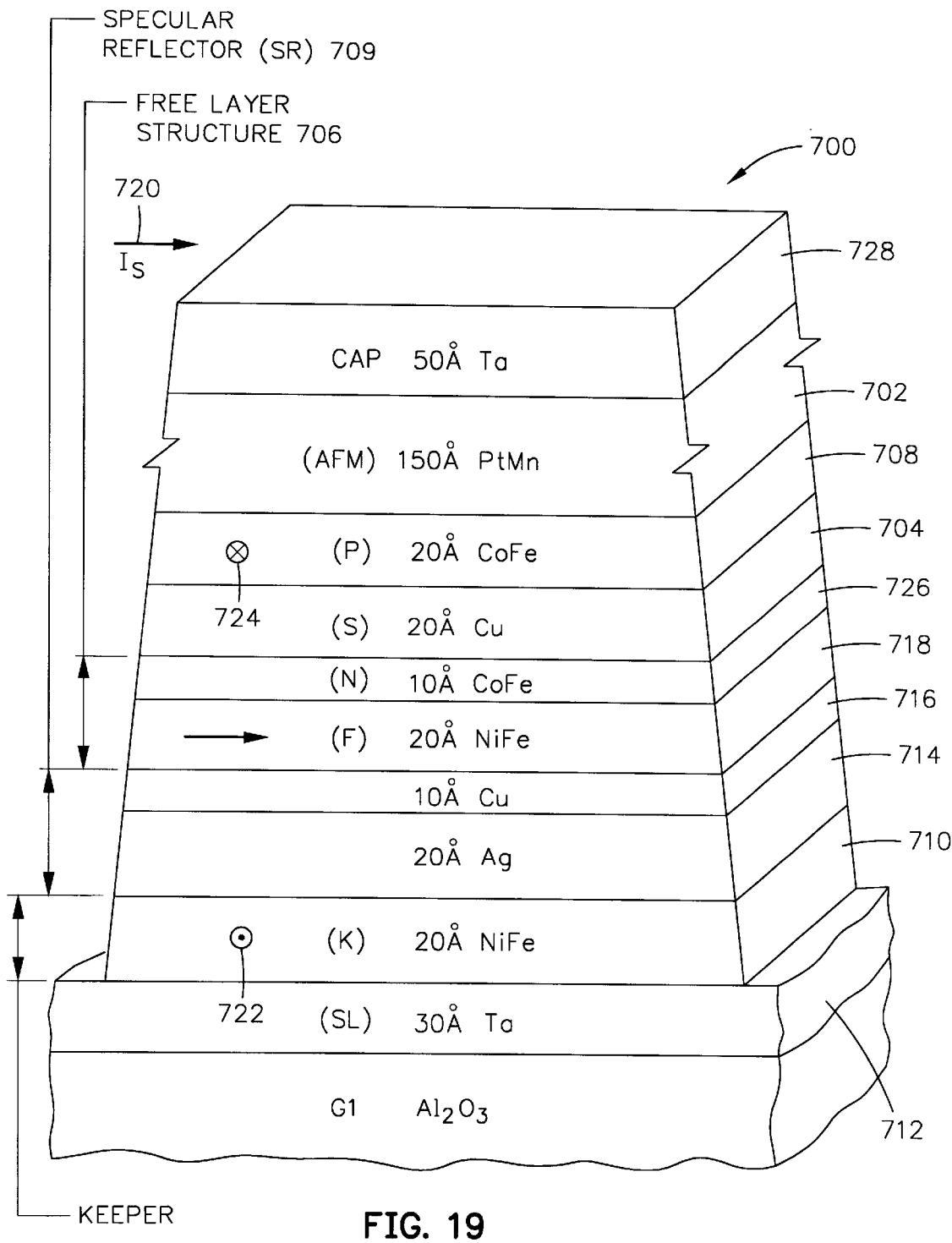
FIG. 19 is a fifth embodiment of the present spin valve sensor with a specular reflector structure between a keeper layer and a free layer structure.

A fifth embodiment of the present spin valve sensor 700 is shown in FIG. 19. This spin valve sensor is known in the art as a top spin valve sensor since the pinning layer 702 is located at the top of the spin valve sensor instead of at the bottom of the spin valve sensor. This means that the pinning layer 702 is formed after formation of the layers shown therebelow. The previous spin valve sensors are bottom spin valve sensors since their pinning layers are located at the bottom. The spin valve sensor 700 includes a spacer layer 704 which is located between a free layer structure 706 and a pinned layer 708. The pinned layer 708 may be a single layer or an AP pinned layer structure, as shown in FIG. 16. A specular reflector layer 709 is located between the free layer structure 706 and a keeper layer 710. The keeper layer 710 is located on a seed layer (SL) 712 which may be composed of 30 Å of tantalum (Ta). In a preferred embodiment the specular reflector structure 709 has a first specular reflector layer 714 which may be composed of 20 Å of silver (Ag) and a second specular reflector layer 716 which may be composed of 10 Å of copper (Cu). The silver (Ag) of the first specular reflector layer 714 provides specular reflection of conduction electrons as described hereinabove. The copper (Cu) of the second specular reflector layer 716 promotes an improved microstructure of the nickel iron (NiFe) of the free layer (F) 718.

The sense current $I_S$ 720 may be from left to right, the magnetic moment 722 of the keeper layer may be perpendicular to and toward the ABS and the magnetic moment 724 of the pinned layer may be perpendicular to and away from the ABS, as shown in FIG. 19. The spin valve sensor 700 in FIG. 19 will have the same advantages of a closed loop for the demagnetization fields of the keeper and pinned layers 710 and 708, and counterbalancing of the ferromagnetic coupling fields and the sense current fields from the keeper and pinned layers 710 and 708 on the free layer, as described hereinabove in regard to the other spin valve sensors.

The keeper layer 710 may be 50 Å of nickel iron (NiFe), the free layer 718 may be 20 Å of nickel iron (NiFe), the nanolayer (N) 726 may be 10 Å of cobalt iron (CoFe), the spacer layer 704 may be 20 Å of copper (Cu), the pinned layer 708 may be 20 Å of cobalt iron (CoFe), the pinning layer 702 may be 150 Å of platinum manganese (PtMn) and a cap layer 728 composed of 50 Å of tantalum (Ta) may be located on the pinning layer 702.

Figure 20:
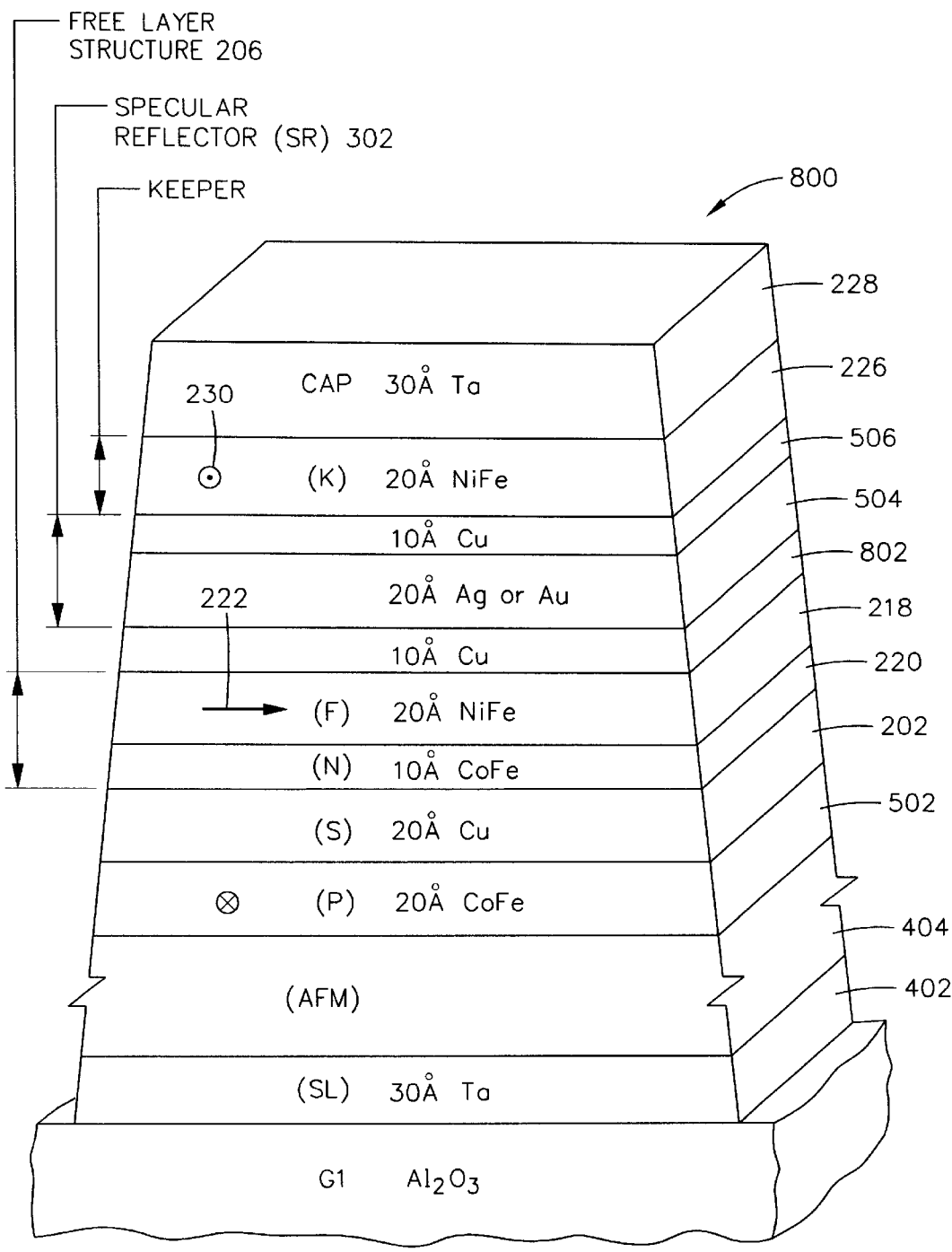
FIG. 20 is a sixth embodiment of the present spin valve sensor with a specular reflector structure between a keeper layer and a free layer structure.

A sixth embodiment of the present spin valve sensor 800 is shown in FIG. 20 which is the same as the spin valve sensor in FIG. 17 except for a 10 Å thick copper (Cu) layer 802 located between the first specular reflector layer 504 and the free layer 218. The copper (Cu) layer 802 interfaces the free layer 218 and further enhances the magnetoresistive coefficient dr/R of the sensor.

Discussion

It should be understood that many variations may be implemented with regard to the spin valve sensors described hereinabove without departing from the spirit of the invention. The pinned layer structures may either be a single pinned layer 502, as shown in FIG. 17, or an antiparallel pinned layer structure 406 as shown in FIG. 16. The pinning layers may be any of the aforementioned antiferromagnetic materials. The free layer structure may be a single layer such as the free layer 218 in FIG. 14 without the nanolayer 220. In a broad concept of the invention a specular reflector layer or structure is employed between a free layer or a free layer structure and a keeper layer.

Clearly, other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

I claim:

1. A read head including a spin valve sensor comprising:
    the spin valve sensor including:
        a ferromagnetic pinned layer structure having a magnetic moment;
        an antiferromagnetic (AFM) pinning layer exchange coupled to the pinned layer structure for pinning the magnetic moment of the pinned layer structure;
        a ferromagnetic free layer structure having a magnetic moment that is free to rotate in response to signal fields;
        a nonmagnetic conductive spacer layer located between the pinned and free layer structures;
        a ferromagnetic keeper layer;
        a nonmagnetic conductive specular reflector layer structure located between and interfacing the keeper layer and the free layer structure;
        the specular reflector layer structure being a bilayer specular reflector structure including first and second specular reflector layers; and
        the first and second specular reflector layers being composed of different materials selected from a group consisting of copper (Cu), gold (Au) and silver (Ag).

2. A read head as claimed in claim 1 wherein the first specular reflector layer is copper (Cu) and interfaces the free layer structure and the second specular reflector layer is gold (Au) or silver (Ag) and is located between and interfaces the first specular reflector layer and the keeper layer.

3. A read head as claimed in claim 2 wherein the second specular reflector layer is thicker than the first specular reflector layer.

4. A read head as claimed in claim 1 wherein the first specular reflector layer is gold (Au) or silver (Ag) and interfaces the free layer structure and the second specular reflector layer is copper (Cu) and is located between and interfaces the first specular reflector layer and the keeper layer.

5. A read head as claimed in claim 1 wherein the first specular reflector layer is copper (Cu) and interfaces the free layer structure and the second specular reflector layer is silver (Ag) and is located between and interfaces the first specular reflector layer and the keeper layer.

6. A read head as claimed in claim 5 wherein the second specular reflector layer is thicker than the first specular reflector layer.

7. A magnetic head assembly having a read head and a write head comprising:
    the write head including:
        first and second pole piece layers;
        each of the first and second pole piece layers having a yoke portion located between a pole tip portion and a back gap portion;
        a nonmagnetic write gap layer located between the pole tip portions of the first and second pole piece layers;
        an insulation stack with at least one coil layer embedded therein located between the yoke portions of the first and second pole piece layers; and
        the first and second pole piece layers being connected at their back gap portions; and
    the read head including:
        a spin valve sensor located between nonmagnetic nonconductive first and second read gap layers; and
        the first and second read gap layers being located between a ferromagnetic first shield layer and the first pole piece layer; and
    the spin valve sensor including:
        a ferromagnetic pinned layer structure having a magnetic moment;
        an antiferromagnetic (AFM) pinning layer exchange coupled to the pinned layer structure for pinning the magnetic moment of the pinned layer structure;
        a ferromagnetic free layer structure having a magnetic moment that is free to rotate in response to signal fields;
        a nonmagnetic conductive spacer layer located between the pinned and free layer structures;
        a ferromagnetic keeper layer;
        a nonmagnetic conductive specular reflector layer structure located between and interfacing the keeper layer and the free layer structure;
        the specular reflector structure being a bilayer specular reflector layer structure including first and second specular reflector layers; and
        the first and second specular reflector layers being composed of different materials selected from a group consisting of copper (Cu), gold (Au) and silver (Ag).

8. A magnetic head assembly as claimed in claim 7 wherein the first specular reflector layer is copper (Cu) and interfaces the free layer structure and the second specular reflector layer is gold (Au) or silver (Ag) and is located between and interfaces the first specular reflector layer and the keeper layer.

9. A magnetic head assembly as claimed in claim 8 wherein the second specular reflector layer is thicker than the first specular reflector layer.

10. A magnetic head assembly as claimed in claim 7 wherein the first specular reflector layer is copper (Cu) and interfaces the free layer structure and the second specular reflector layer is silver (Ag) and is located between and interfaces the first specular reflector layer and the keeper layer.

11. A magnetic head assembly as claimed in claim 10 wherein the second specular reflector layer is thicker than the first specular reflector layer.

12. A magnetic disk drive having at least one slider that has an air bearing surface (ABS), the slider supporting at least one magnetic head assembly that includes a read head and a write head, the disk drive comprising:

the write head including:
  first and second pole piece layers;
  each of the first and second pole piece layers having a yoke portion located between a pole tip portion and a back gap portion;
  a nonmagnetic write gap layer located between the pole tip portions of the first and second pole piece layers;
  an insulation stack with at least one coil layer embedded therein located between the yoke portions of the first and second pole piece layers; and
  the first and second pole piece layers being connected at their back gap portions; and the read head including:
  a spin valve sensor located between nonmagnetic nonconductive first and second read gap layers; and
  the first and second read gap layers being located between a ferromagnetic first shield layer and the first pole piece layer; and the spin valve sensor including:
  a ferromagnetic pinned layer structure having a magnetic moment;
  an antiferromagnetic (AFM) pinning layer exchange coupled to the pinned layer structure for pinning the magnetic moment of the pinned layer structure;
  a ferromagnetic free layer structure having a magnetic moment that is free to rotate in response to signal fields;
  a nonmagnetic conductive spacer layer located between the pinned and free layer structures;
  a ferromagnetic keeper layer;
  a nonmagnetic conductive specular reflector layer structure located between and interfacing the keeper layer and the free layer structure;
  the specular reflector layer structure being a bilayer specular reflector structure including first and second specular reflector layers;
  the first and second specular reflector layers being composed of different materials selected from a group consisting of copper (Cu), gold (Au) and silver (Ag);

a housing;
a magnetic disk rotatably supported in the housing;
a support mounted in the housing for supporting the magnetic head assembly with its ABS facing the magnetic disk so that the magnetic head assembly is in a transducing relationship with the magnetic disk;
a spindle motor for rotating the magnetic disk;
an actuator connected to the support for moving the magnetic head assembly to multiple positions with respect to said magnetic disk; and
a processor connected to the magnetic head assembly, to the spindle motor and to the actuator for exchanging signals with the magnetic head assembly, for controlling rotation of the magnetic disk and for controlling the position of the magnetic head assembly relative to the magnetic disk.

13. A magnetic disk drive as claimed in claim 12 wherein the first specular reflector layer is copper (Cu) and interfaces the free layer structure and the second specular reflector layer is gold (Au) or silver (Ag) and is located between and interfaces the first specular reflector layer and the keeper layer.

14. A magnetic disk drive as claimed in claim 13 wherein the second specular reflector layer is thicker than the first specular reflector layer.

15. A magnetic disk drive as claimed in claim 12 wherein the first specular reflector layer is copper (Cu) and interfaces the free layer structure and the second specular reflector layer is silver (Ag) and is located between and interfaces the first specular reflector layer and the keeper layer.

16. A magnetic disk drive as claimed in claim 15 wherein the second specular reflector layer is thicker than the first specular reflector layer.

17. A method of making a read head that includes a spin valve sensor comprising the unordered steps of:

making the spin valve sensor as follows:
  forming a ferromagnetic pinned layer structure having a magnetic moment;
  forming an antiferromagnetic (AFM) pinning layer exchange coupled to the pinned layer structure for pinning the magnetic moment of the pinned layer structure in a first direction;
  forming a ferromagnetic free layer structure having a magnetic moment that is capable of rotating from a second direction;
  forming a nonmagnetic conductive spacer layer between the pinned and free layer structures;
  forming a ferromagnetic keeper layer;
  forming a nonmagnetic conductive specular reflector layer structure between and interfacing the keeper layer and the free layer structure;
  the specular reflector structure being a bilayer specular reflector layer structure formed of first and second specular reflector layers; and
  the first and second specular reflector layers being formed of different materials selected from a group consisting of copper (Cu), gold (Au) and silver (Ag).

18. A method as claimed in claim 17 wherein the first specular reflector layer is formed of copper (Cu) and interfaces the free layer structure and the second specular reflector layer is formed of gold (Au) or silver (Ag) and is located between and interfaces the first specular reflector layer and the keeper layer.

19. A method as claimed in claim 18 wherein the second specular reflector layer is formed thicker than the first specular reflector layer.

20. A method as claimed in claim 17 wherein the first specular reflector layer is formed of gold (Au) or silver (Ag) and interfaces the free layer structure and the second specular reflector layer is formed of copper (Cu) and is located between and interfaces the first specular reflector layer and the keeper layer.

21. A method as claimed in claim 17 wherein the first specular reflector layer is formed of copper (Cu) and interfaces the free layer structure and the second specular reflector layer is formed of silver (Ag) and is located between and interfaces the first specular reflector layer and the keeper layer.

22. A method as claimed in claim 21 wherein the second specular reflector layer is formed thicker than the first specular reflector layer.

23. A method of making a magnetic head assembly that includes a write head and a read head comprising the unordered steps of:

making the write head as follows:
  forming first and second pole piece layers with each of the first and second pole piece layers having a yoke portion located between a pole tip portion and a back gap portion;
  forming a nonmagnetic write gap layer between the pole tip portions of the first and second pole piece layers;
  forming an insulation stack with at least one coil layer embedded therein between the yoke portions of the first and second pole piece layers; and
  connecting the first and second pole piece layers at their back gap portions; and
making the read head as follows:
  forming a spin valve sensor between nonmagnetic nonconductive first and second read gap layers; and
  forming the first and second read gap layers between a ferromagnetic first shield layer and the first pole piece layer; and
making the spin valve sensor as follows:
  forming a ferromagnetic pinned layer structure having a magnetic moment;
  forming an antiferromagnetic (AFM) pinning layer exchange coupled to the pinned layer structure for pinning the magnetic moment of the pinned layer structure in a first direction;
  forming a ferromagnetic free layer structure having a magnetic moment that is capable of rotating from a second direction;
  forming a nonmagnetic conductive spacer layer between the pinned and free layer structures;
  forming a ferromagnetic keeper layer;
  forming a nonmagnetic conductive specular reflector layer structure between and interfacing the keeper layer and the free layer structure;
  the specular reflector structure being a bilayer specular reflector structure formed of first and second specular reflector layers; and
  the first and second specular reflector layers being formed of different materials selected from a group consisting of copper (Cu), gold (Au) and silver (Ag).

24. A method as claimed in claim 23 wherein the first specular reflector layer is formed of copper (Cu) and interfaces the free layer structure and the second specular reflector layer is formed of gold (Au) or silver (Ag) and is located between and interfaces the first specular reflector layer and the keeper layer.

25. A method as claimed in claim 24 wherein the second specular reflector layer is formed thicker than the first specular reflector layer.

26. A method as claimed in claim 23 wherein the first specular reflector layer is formed of copper (Cu) and interfaces the free layer structure and the second specular reflector layer is formed of silver (Ag) and is located between and interfaces the first specular reflector layer and the keeper layer.

27. A method as claimed in claim 26 wherein the second specular reflector layer is formed thicker than the first specular reflector layer.

* * * * *